(12) United States Patent
Koronai et al.

(10) Patent No.: US 11,136,948 B2
(45) Date of Patent: Oct. 5, 2021

(54) MULTI-MODAL MULTI-MEDIA AIR FILTRATION SYSTEM

(71) Applicant: MANN+HUMMEL GmbH, Ludwigsburg (DE)

(72) Inventors: Anja Koronai, Ludwigsburg (DE); Thomas Loehl, Mundelsheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 308 days.

(21) Appl. No.: 16/352,068

(22) Filed: Mar. 13, 2019

(65) Prior Publication Data

US 2020/0291907 A1    Sep. 17, 2020

(51) Int. Cl.
*B01D 50/00*     (2006.01)
*F02M 35/024*    (2006.01)
*B01D 46/52*     (2006.01)
*F02M 35/022*    (2006.01)
*F02M 35/02*     (2006.01)
*B01D 46/24*     (2006.01)
*B01D 46/00*     (2006.01)

(52) U.S. Cl.
CPC ..... *F02M 35/0245* (2013.01); *B01D 46/2411* (2013.01); *B01D 46/521* (2013.01); *F02M 35/0201* (2013.01); *F02M 35/0226* (2013.01); *F02M 35/02416* (2013.01); *B01D 46/002* (2013.01); *B01D 46/2414* (2013.01); *F02M 35/0214* (2013.01); *F02M 35/0215* (2013.01)

(58) Field of Classification Search
CPC ........... F02M 35/0245; F02M 35/0226; F02M 35/0201; F02M 35/02416; F02M 35/0215; F02M 35/0214; B01D 46/521; B01D 46/002; B01D 46/2414; B01D 46/2411

See application file for complete search history.

(56) References Cited

U.S. PATENT DOCUMENTS

| 4,812,149 | A | * | 3/1989 | Griffin | B01D 46/002 423/74 |
| 6,758,874 | B1 | * | 7/2004 | Hunter, Jr. | A47L 9/20 15/352 |
| 2006/0021507 | A1 | | 2/2006 | Costura et al. | |
| 2008/0168902 | A1 | | 7/2008 | Suzuki | |

(Continued)

FOREIGN PATENT DOCUMENTS

| DE | 20002344 U1 | 8/2000 |
| DE | 102004036083 B4 | 2/2006 |

(Continued)

*Primary Examiner* — Dung H Bui
(74) *Attorney, Agent, or Firm* — James Hasselbeck

(57) ABSTRACT

The present invention relates to a multi-modal multi-media air filtration system which can include: a base having one or more connection features and a filter media assembly, the filter media assembly being configured to attach to the base at a first end and the cap at a second end. The filter media assembly also including a first filter media extending across a primary air flow path and a second filter media extending across a secondary air flow path. The air filtration assembly then includes a blocking mechanism and an actuation assembly being configured to work together so as to selectively open or close the secondary air flow path so as to alternate the degree of filtration passing through the filter media based on the degree of desired filtration.

24 Claims, 13 Drawing Sheets

(56) References Cited

U.S. PATENT DOCUMENTS

| | | | | |
|---|---|---|---|---|
| 2009/0183475 | A1* | 7/2009 | Dauber | B01D 46/521 |
| | | | | 55/385.6 |
| 2009/0205498 | A1* | 8/2009 | Wang | B01D 46/0065 |
| | | | | 95/279 |
| 2010/0186354 | A1 | 7/2010 | Braithwaite | |
| 2014/0305862 | A1* | 10/2014 | Zur | B01D 29/686 |
| | | | | 210/333.01 |
| 2020/0179840 | A1* | 6/2020 | Vichev | B01D 46/2414 |
| 2021/0100415 | A1* | 4/2021 | Sang | B01D 46/2414 |

FOREIGN PATENT DOCUMENTS

| | | |
|---|---|---|
| EP | 1935475 A1 | 6/2008 |
| KR | 19980037877 U | 9/1998 |
| KR | 19980078682 A | 11/1998 |
| KR | 20000034662 A | 6/2000 |
| KR | 101533161 B1 | 7/2015 |

\* cited by examiner

MULTI-MODAL MULTI-MEDIA AIR FILTRATION SYSTEM

FIELD OF THE INVENTION

The present disclosure generally relates to the field of air filtration, and more particularly to air filtration systems within vehicles and machinery.

BACKGROUND OF THE INVENTION

Large motorized machinery, vehicles, etc. will often operate in a wide variety of environmental and performance conditions. In response to these conditions the vehicles can then have varying associated degrees of required air filtration parameters which might be desired, or necessary, for a particular application. It is well understood that these machines operate in an optimal fashion when the filter elements are regularly replaced or cleaned. Changing or cleaning the filter element prematurely can be prohibitively expensive while using certain performance-based filters which increase air-flow, but at the cost of reduced filtration can lead to damage when used over prolonged periods. Typically, a particular filter media is selected which only includes a single filter element with a common media throughout. In such cases, filtration or performance standards can only be changed through a complete removal of the existing filter element and replacement with a new filter element having the desired media having desired filtration and flow properties.

Changing a filter element can be time consuming and can provide various situations which can cause damage to filter elements or allow unwanted contaminants into the air intake during changing operations. Further, fine filter elements can cause inefficiency in the motor, while high-pass-through elements can often allow harmful particulates to enter the machinery, such as into the combustion chamber, and cause premature wear and failing. However, in engines or machinery which operate in a wide range of conditions or performance situations, typically, a single filter element is selected for the air intake despite the existence of a wide spectrum of filtration needs.

SUMMARY OF THE INVENTION

It has been recognized that many different engines and machinery could benefit from an air filtration system which has various filtration media provided therein which can operate in a plurality of modes which can change an air intake flow path through a desired media based on various desired performance levels or environmental conditions. The various modes as contemplated herein can then be selected manually by the user, or the modes can be changed automatically in response to sensed environmental conditions or operational states.

As such, a multi-modal multi-media air filtration system is contemplated herein which can include a base which can be configured to attach to an air intake of a vehicle, a cap, and a filter media assembly which is provided between the base and the cap. The filter media assembly can then be configured to attach to the base at a first end and to the cap at a second end, the filter media assembly having an annular cross-section which can be cylindrical or tapered so as to form a cone.

The filter media assembly can then include a first filter media extending along a first annular segment about a circumferential portion of the filter media assembly, wherein a flow path across the first filter media is defined as a primary flow path, wherein the primary flow path extends through a first sidewall portion of the filter media assembly across the first filter media; and a second filter media extending along a second annular segment about a circumferential portion of the filter media assembly, wherein a flow path across the second filter media is defined as a secondary flow path, wherein the secondary flow path extends through a second sidewall portion of the filter media assembly across the second filter media.

A blocking mechanism can then be provided about the filter media assembly, wherein the blocking mechanism can be configured to move so as to selectively switch between a closed configuration in which only the primary flow path is utilized and an open configuration in which the secondary flow path may be alternatively or additionally utilized.

An actuation assembly can then be provided which can be configured to be coupled to the blocking mechanism, wherein the actuation assembly can then be configured to effectuate movement of the blocking mechanism.

In some embodiments the actuation assembly can include an actuator located on an interior surface of the base, wherein the actuator can be configured to move the blocking mechanism so as to selectively seal or open the secondary flow path. In some such embodiments the blocking mechanism can be configured such that it pivots on a shaft, wherein the actuator provides a rotational force to the shaft.

In some embodiments, the blocking mechanism can be provided as a curved panel, wherein the curved panel corresponding in shape and size to an interior surface of the second filter media, i.e. be a segment of a cone or a cylinder so as to match the interior surface of the associated filter media.

In some embodiments the first filter media and the second filter media are affixed to one another at opposing respective segments at a first seam and at a second seam, wherein the shaft is located parallel to and about the first seam, and wherein the blocking mechanism extends from the shaft to the second seam abutting the second filter media in the closed configuration.

In some embodiments a pair of sealing protrusions can be provided, wherein a first sealing protrusion or flange can be provided about the cap, and a second sealing protrusion or flange can be provided about the base, wherein the respective sealing protrusions are configured to seal against opposing edges of the blocking mechanism in the closed configuration.

In some additional embodiments, a sealing strip can be provided about the second seam of the filter media assembly, wherein the blocking mechanism seals against the sealing strip at a distal edge from the shaft in the closed configuration.

In yet additional embodiments, while the various filter media can have any desired flow, filtration, or other property, in some advantageous embodiments, the first filter media can be provided having a higher relative flow resistance corresponding to a smaller aperture size thus providing finer filtration than the second filter media. In other words, the second filter media can be provided which has a lower relative flow resistance corresponding to a larger aperture size, thus providing less filtration, than the first filter media.

In some embodiments, the actuation assembly can include an actuator configured so as to provide rotation to the shaft of the blocking mechanism. In some such embodiments, the actuator can be a solenoid.

In some embodiments the actuation assembly can be integral with, or affixed to the base. However, in some alternative embodiments the actuation assembly can be provided within the air intake to the vehicle to which the base is configured to be affixed such that the actuator is not directly affixed to the base, but only capable of interacting with the blocking mechanism near the base. In some such embodiments the shaft can be provided with a keyed end, and the actuation assembly can then be provided with a corresponding keyed driver configured to receive the keyed end of the shaft upon installation of the base onto the air intake of the vehicle. Further, in some such embodiments the shaft can be provided with a torsional spring configured to bias the blocking mechanism in the closed configuration.

In yet additional such embodiments, the base can be provided with one or more alignment or locking features configured to interact with corresponding alignment or locking features provided on the air intake of the vehicle. In such cases the alignment or locking features can be configured so as to ensure proper radial alignment of the keyed end of the shaft within the keyed driver of the actuation assembly during mounting.

In some additional embodiments, the system can be provided with a controller, the controller can then be configured to transmit commands for the actuation assembly to alternate the blocking mechanism between the closed configuration and the open configuration as well as potentially a partially open configuration. In some such embodiments, the controller can also include a user input interface which can then be configured to receive user commands with respect to a desired configuration.

In some alternative embodiments, the system can also include a plurality of sensors configured to detect one or more parameters and transmit data to the controller, wherein the controller can process the data and make a determination regarding whether to operate the multi-modal multi-media filtration system in the open configuration, the closed configuration, or in a partially open configuration wherein the controller then controls the actuation assembly so as to enter an optimal state of filtration.

In some embodiments, and depending on the type of filter media selected, a support structure can be provided about one of the first filter media or the second filter media so as to maintain structural integrity. As discussed briefly above, such as instances in which the second filter media has larger apertures, the support structure can in many cases be required about the second filter media so as to reduce blowouts or tearing.

Also as contemplated herein, the first filter media and the second filter media can each include a plurality of pleats so as to increase filter media area so as to maintain desired filtration properties with respect to air flow needs of the motor or vehicle.

Also contemplated herein is a method of providing and operating a multi-media filtration system, wherein the method can include the steps of providing any one of the contemplated systems discussed herein, but further including the steps of: actuating the actuation assembly so as to effectuate movement of the blocking mechanism so as to alternate between a closed configuration wherein the blocking mechanism blocks the secondary flow path and an open configuration where the secondary flow path is at least partially open; providing a rotational force to the blocking mechanism.

The method can also include the steps of: providing a controller configured to control the actuation assembly; providing a processor operatively connected to the controller; providing a plurality of sensors configured to detect one or more parameters and transmit data to the processor, wherein the processor is configured to make a determination a determined optimal state of filtration associated with the open configuration, the closed configuration, or in a partially open configuration and instruct the controller to control the actuation assembly so as to enter the determined optimal state of filtration.

This method can also include various alternative steps, which can include: receiving air from an ambient area into an interior portion of the filter media assembly through only the first filter media thus defining a first mode; and alternating to a second mode, the second mode being defined by receiving air through both the first filter media and through the second filter media.

Additionally, the method can include a step of receiving a user input to alternate between the first or closed operation mode and the second or open operation mode or receiving an automatically generated command to alternate between the first operation mode and the second operation mode, the automatically generated command being based on one or more sensed parameters.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

Figure 1:
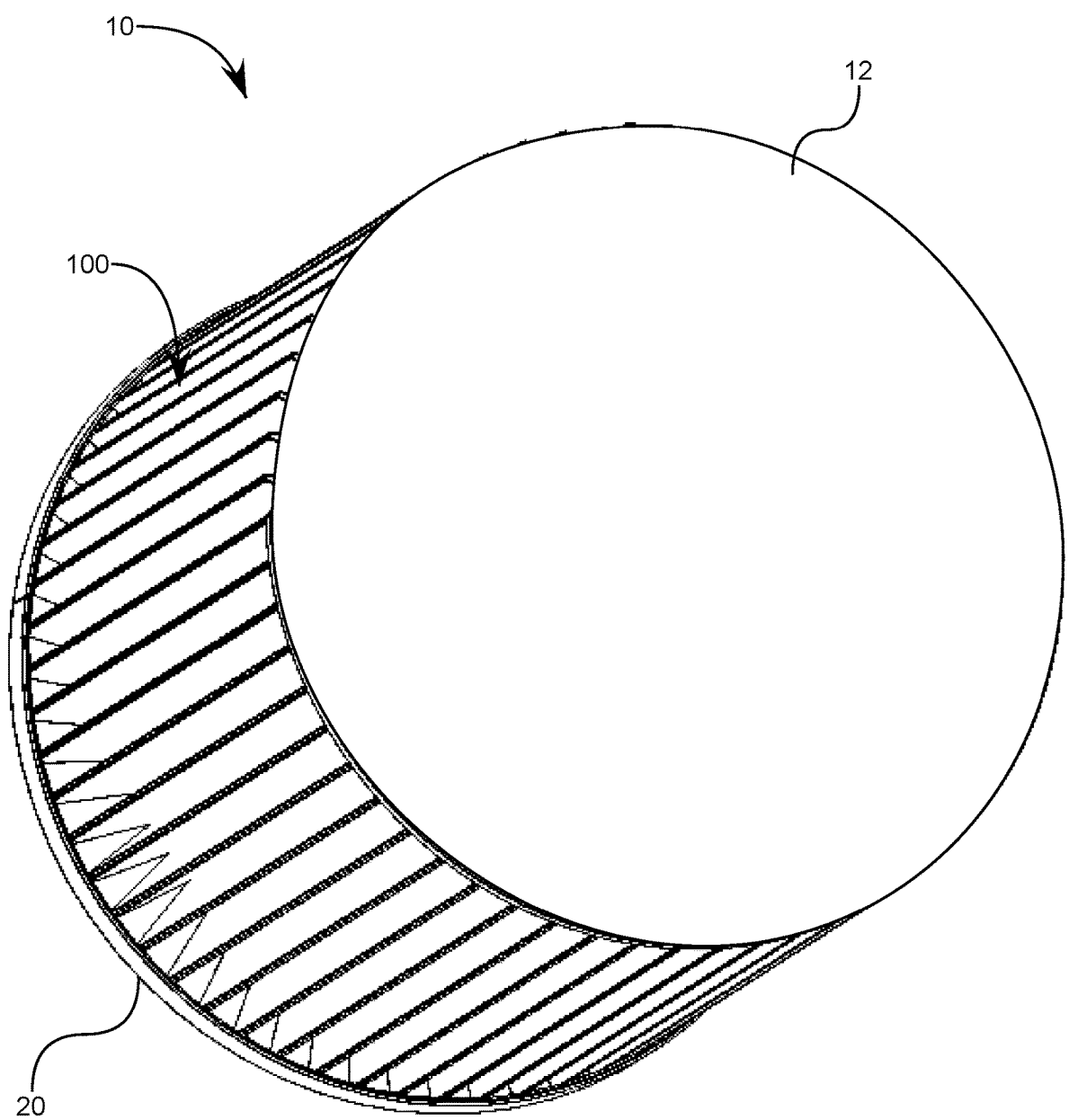
FIG. 1 illustrates a top external perspective view of a multi-modal multi-media air filtration system in accordance with various aspects of the present invention.
Figure 2:
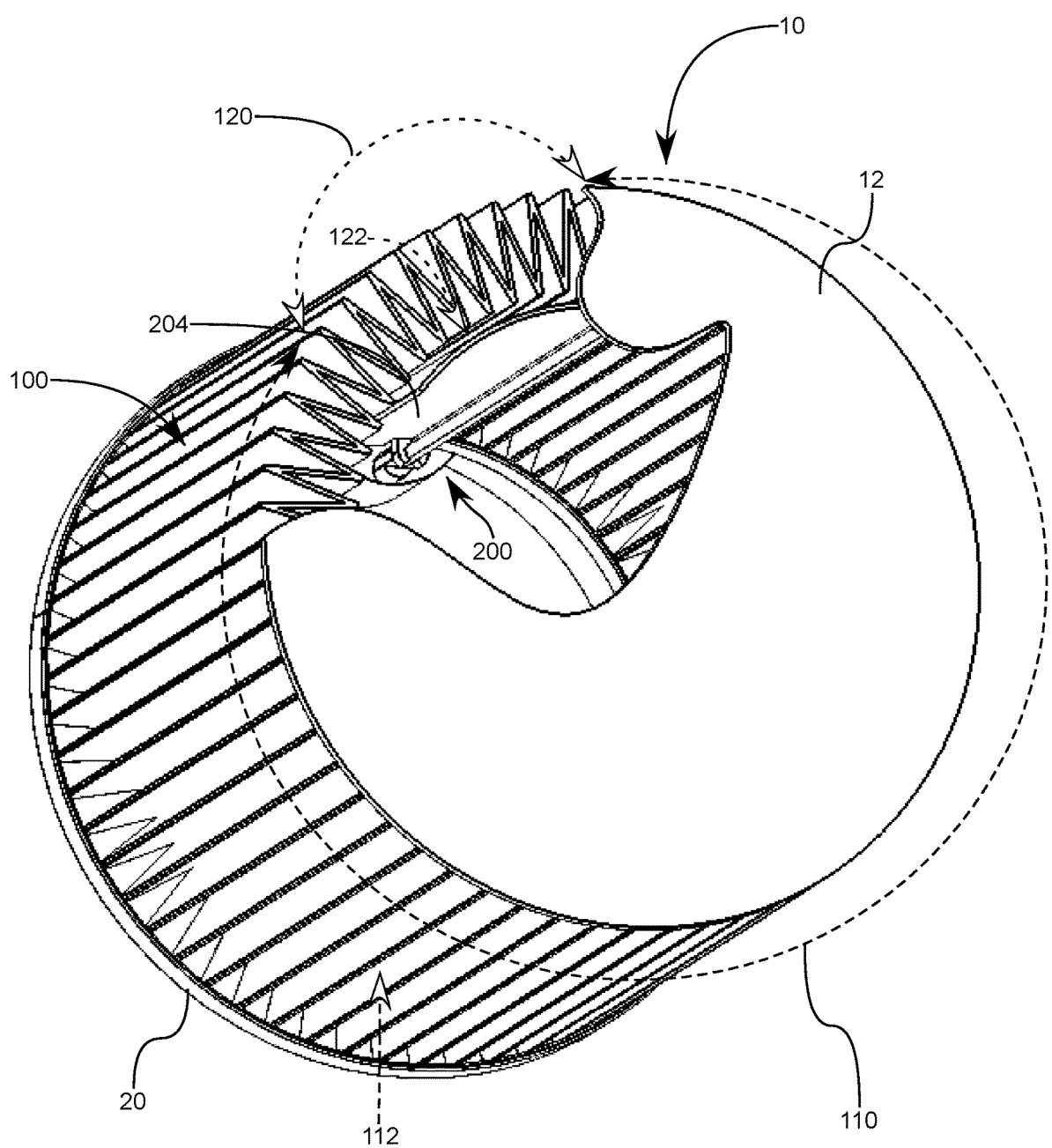
FIG. 2 illustrates a top external partial cutaway perspective view of the multi-modal multi-media air filtration system of FIG. 1 being illustrative of various aspects of the present invention.
Figure 3:
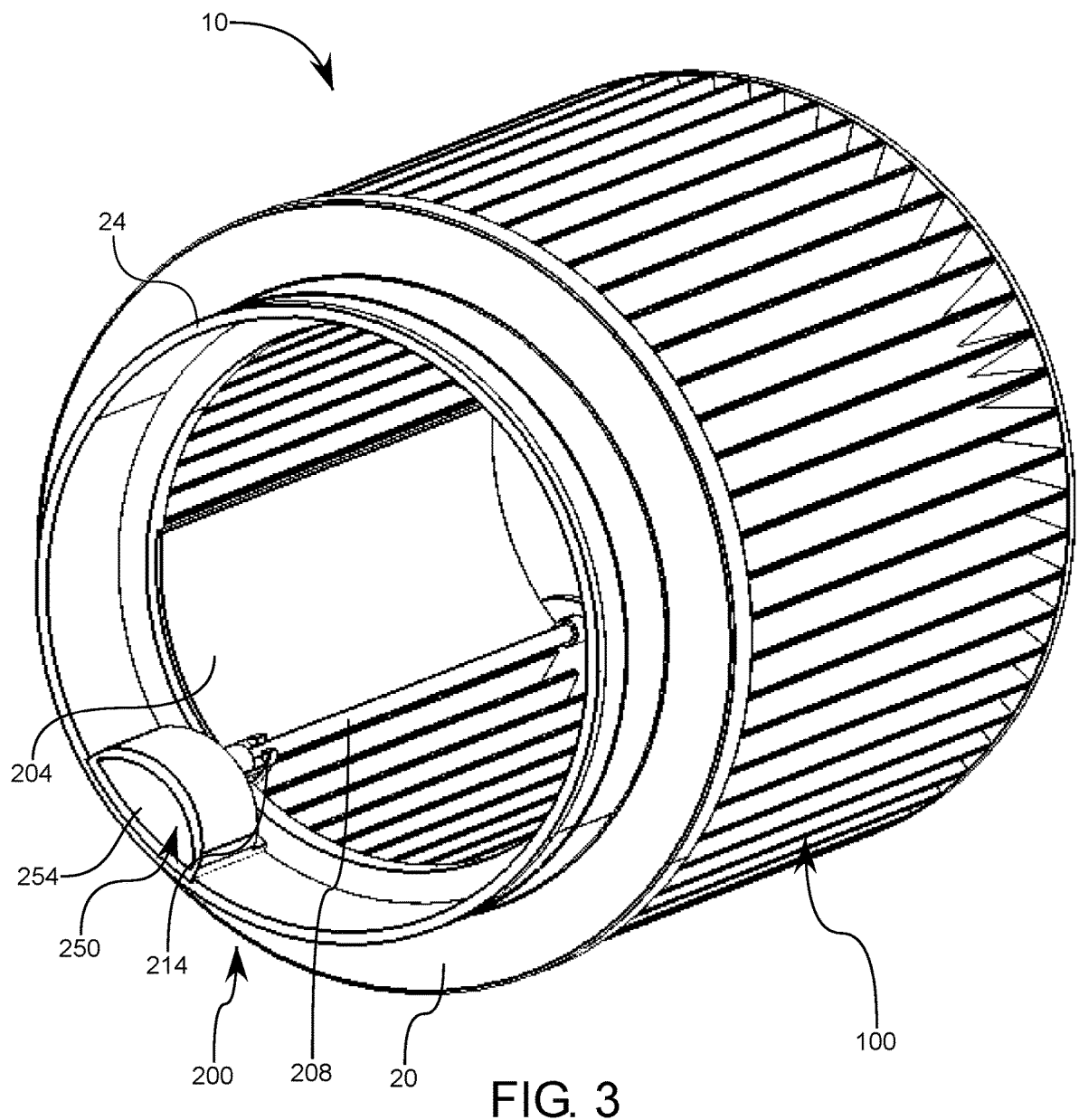
FIG. 3 illustrates a bottom perspective view of the multi-modal multi-media air filtration system of FIG. 1 being illustrative of various aspects of the present invention.
Figure 4:
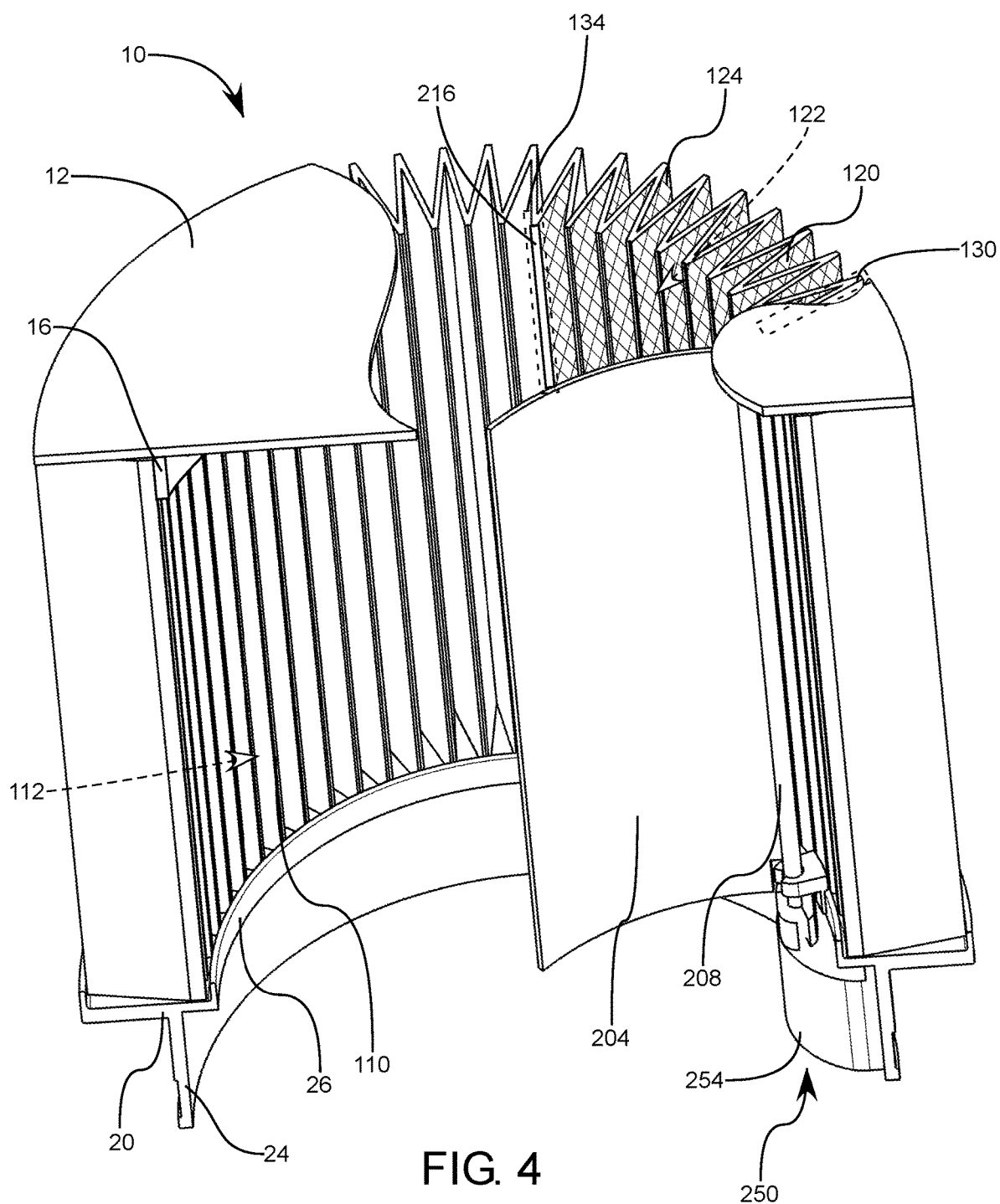
FIG. 4 illustrates a side perspective cross-sectional view of the multi-modal multi-media air filtration system of FIG. 1 in an open or dual flow configuration.
Figure 5:
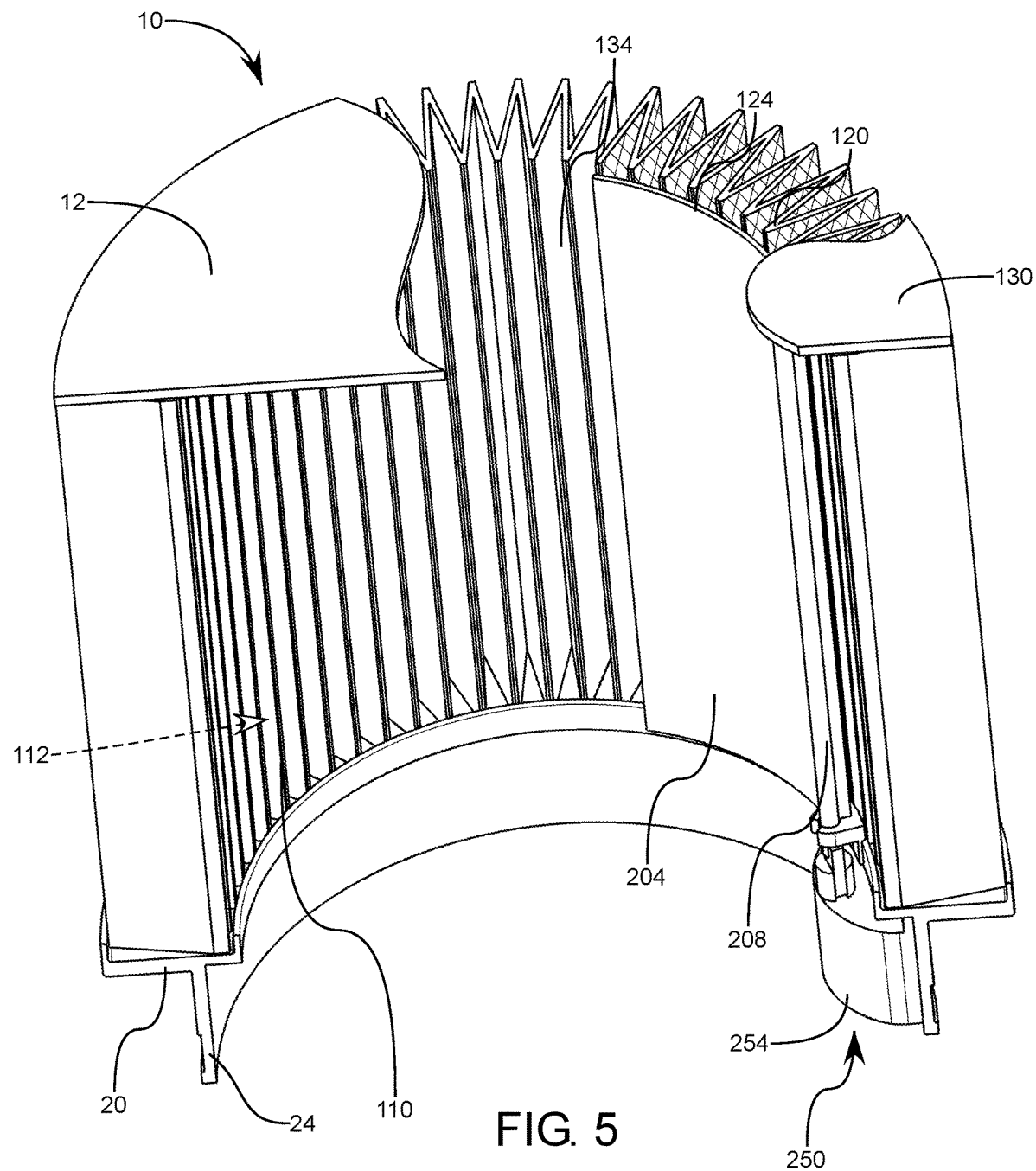
FIG. 5 illustrates a side perspective cross-sectional view of the multi-modal multi-media air filtration system of FIG. 1 in a closed or single flow configuration.
Figure 6:
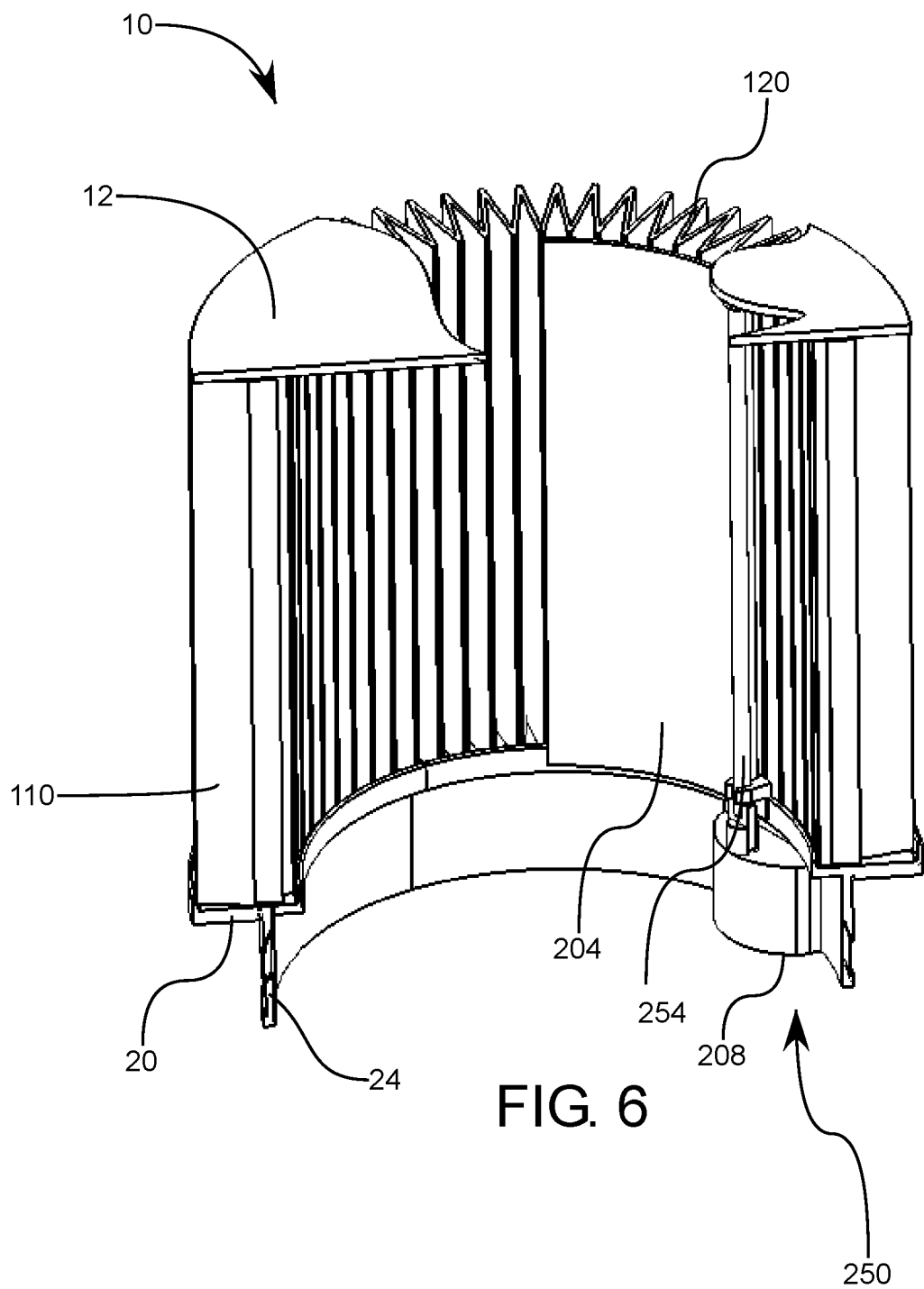
FIG. 6 illustrates an alternative side perspective cross-sectional view of the multi-modal multi-media air filtration system of FIG. 1 in a closed or single flow configuration.
Figure 7:
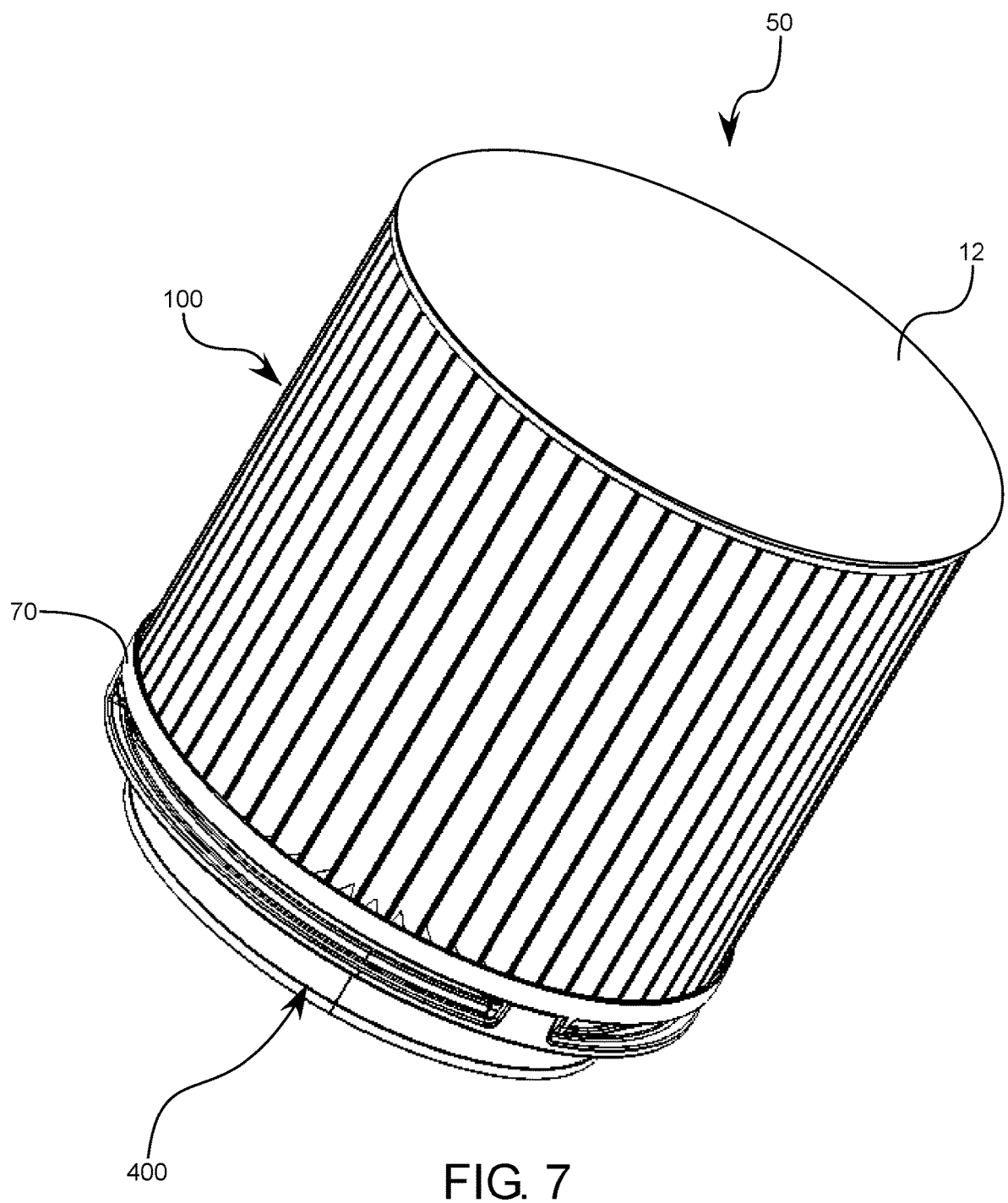
FIG. 7 illustrates a side perspective view of an alternative embodiment of a multi-modal multi-media air filtration system in accordance with various alternative aspects of the present invention.
Figure 8:
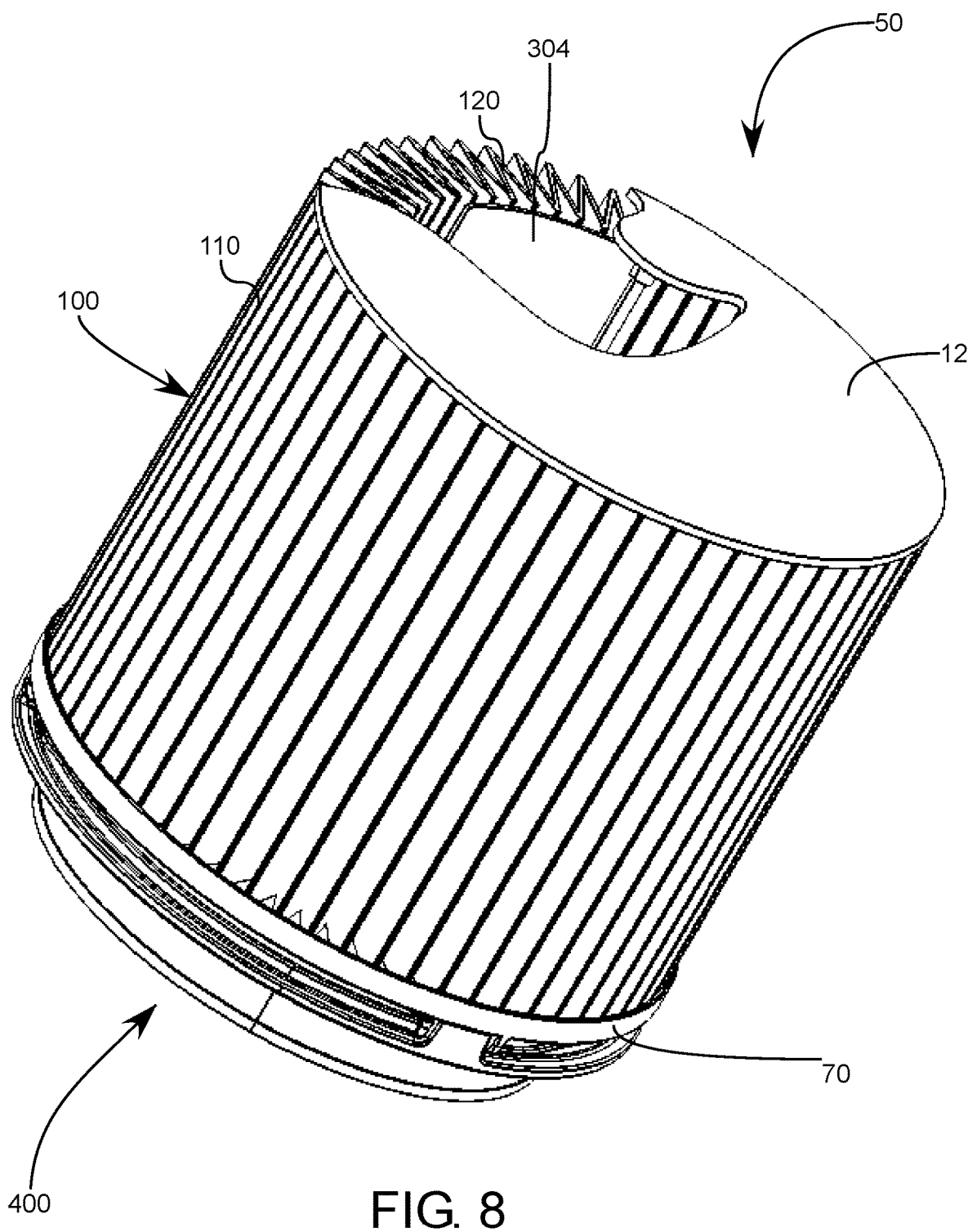
FIG. 8 illustrates a side perspective partial cutaway view of the multi-modal multi-media air filtration system of FIG. 7 in a closed or single flow configuration.
Figure 9:
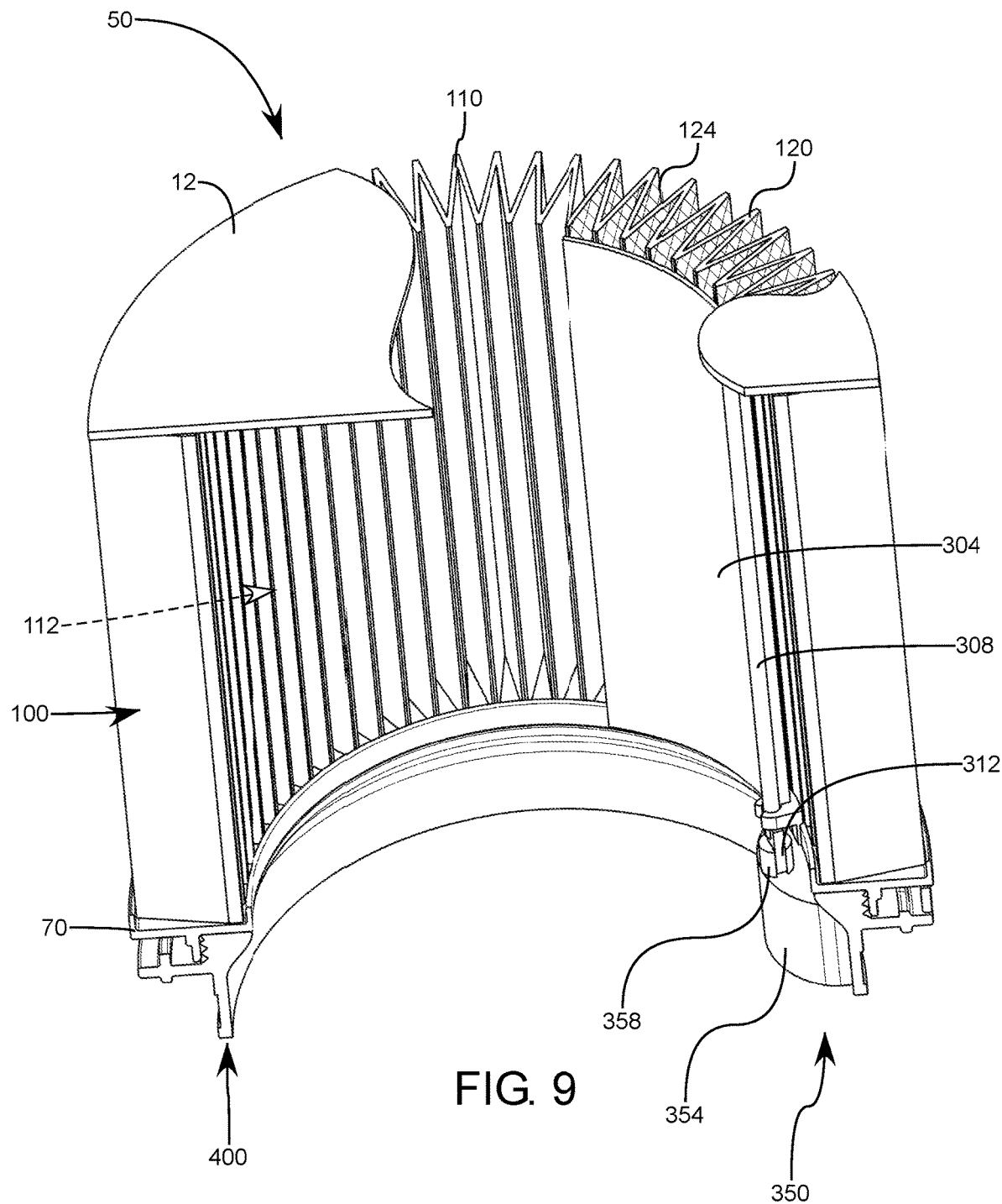
FIG. 9 illustrates a side perspective cross-sectional view of the multi-modal multi-media air filtration system of FIG. 7 in a closed or single flow configuration.
Figure 10:
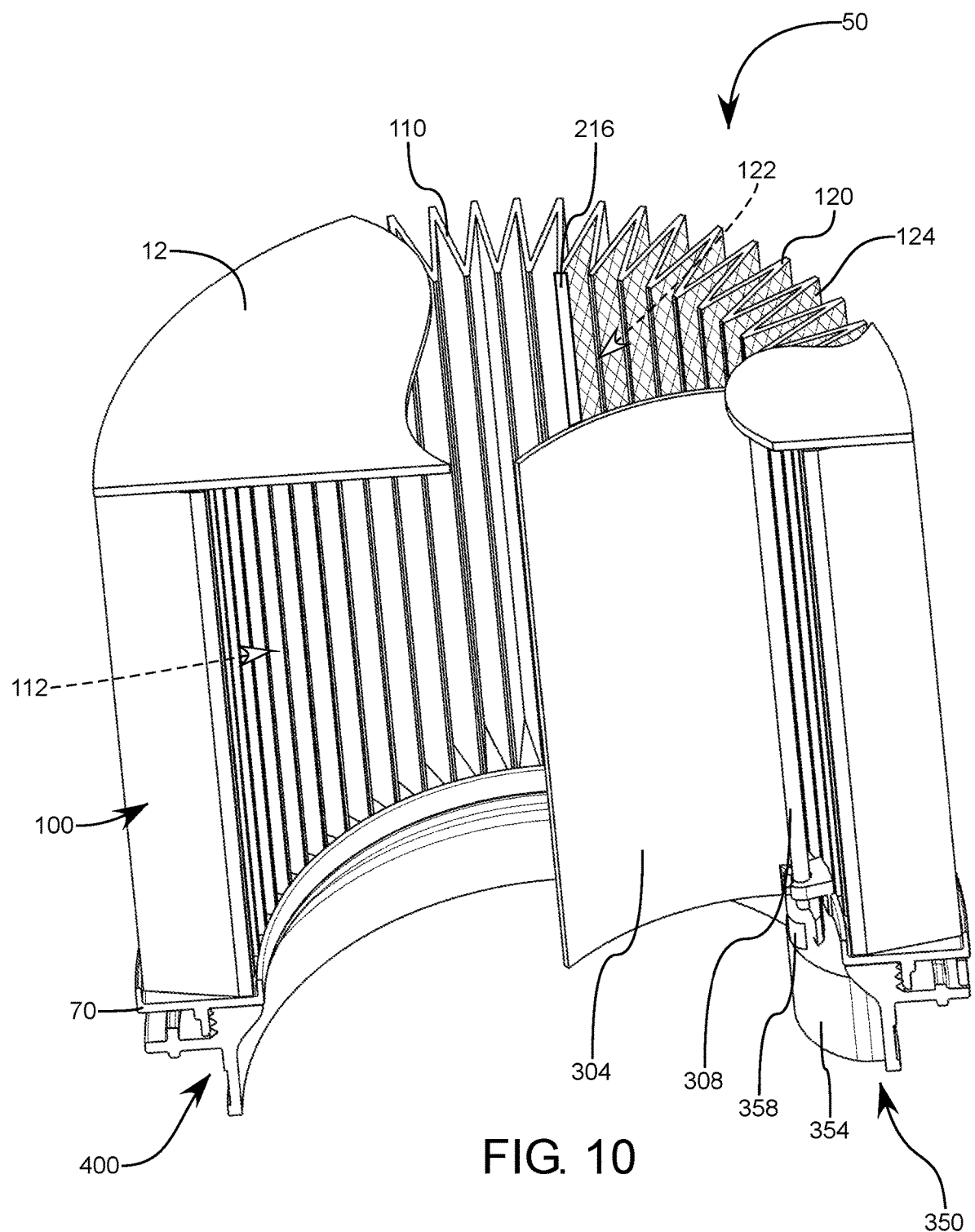
FIG. 10 illustrates a side perspective cross-sectional view of the multi-modal multi-media air filtration system of FIG. 7 in an open or double flow configuration.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or other structure is referred to as being "on" or extending "onto" another element, it can be directly on or extend directly onto the other element or intervening elements may also be present. In contrast, when an element is referred to as being "directly on" or extending "directly onto" another element, there are no intervening elements present.

Likewise, it will be understood that when an element such as a layer, region, or material is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

It will be appreciated by those having skill in the area of air filtration, and particularly in the field of engine air filtration, that various operation modes and environments can often require widely varying filtration needs and airflow requirements which can thus require corresponding variations in filter media specifications.

By way of example, an individual may operate a high-performance car in daily driving for commuting or running everyday errands in associated environments. Such situations may include highway driving residential driving, etc., which do not require high performance and associated high airflow. However, this same car could also be utilized recreationally in race situations, which may be on closed driving tracks in high-performance situations. In such high-performance situations, an increased airflow will be desired for increased power output by the motor, wherein the reduced particulate filtration is tolerated in lieu of the increased airflow, but only for reduced time periods. In such scenarios, the owner may tolerate the lower particulate removal for short time periods for racing purposes, but not be willing to reduce particulate removal for typical everyday driving. However, in previous systems a filter change would be necessary to provide a first filter with increased filtration properties during everyday use, but another filter would be required and need installation for the high-performance use.

An alternative example can be described as thus: in some environments, such as for harvesting equipment, the particulate count in the ambient air can vary greatly based on soil moisture, crop type, etc., and the same harvester can be used for various crops, with associated variations in soil moisture and associated dust, which factors can also vary greatly based on recent rain, weather, or location. As such, increased filtration parameters can be required for some crop types and less for others, or more on dry days, and less on wet days.

Previously, an operator or owner has been required to select a single filter having a single filter media which provides filtration for all operation modes, in all environments. In other words, users have been required to select a single media filter having a low filtration efficiency filter with low filtration performance in order to achieve higher air flow for higher engine performance, which eventually can cause damage to the engine components over time as some particulates inevitably pass through unfiltered. Alternatively, users have been required to select a single media filter having a higher filtration efficiency filter with high filtration performance but ultimately represents a lower air flow and sacrifices engine performance.

Further, the air filtration media can often be burdensome to change or replace, such that operators must either choose an overly robust filter media and sacrifice performance or efficiency by selecting filter media with high resistance but good filtration, or they must alternatively choose a filter media having low filtration with low resistance and potentially sacrifice engine longevity. In such cases due to location and equipment setup it is then typically overly burdensome or inconvenient to change to a filter having an optimized filter media for a particular performance standard, a given environmental particulate level, etc.

As such, one aspect of the present invention is to provide a multi-modal multi-media air filtration system which includes a plurality of varying filter media provided therein having one or more blocking mechanisms which can open or close air pathways across a particular filter media, which allows a user or system to easily switch between operation modes. In this manner, the multiple filter media are utilized based on a desired performance mode or environmental factor, which can be adjusted based on sensed data or based on a user input or selection. The multi-modal multi-media air filtration system can thus include a plurality of filter media across which air can pass wherein the air flow path can be adjusted by means of a blocking mechanism which is utilized to allow or prohibit flow across particular portions or in varying degrees across the various filter media provided within a filter assembly.

FIGS. 1-6 illustrate a first exemplary embodiment of a multi-modal multi-media air filtration system 10. The multi-modal multi-media air filtration system 10 can include a filter media assembly 100 which can be sandwiched between a base 20 and a cap 12. As illustrated herein, the base 20 is configured so as to operate as a connection interface to an air intake for a piece of equipment, not shown herein, but as will be readily appreciated by those having skill in the art. One such example of equipment being a car as discussed above. The base 20 can include one or more connection features 24, which are illustrated in this embodiment as a flange portion which can be inserted into or around a corresponding flange provided about an air intake of the vehicle or otherwise affixed thereto. This flange can be configured to be a male or female connection portion, can include threads or other connection features such as lock rings, snap rings, or any other connection mechanism as will be recognized by those being skilled in the art as any connection feature capable of affixing a filter assembly to an associated air intake. In this manner the air intake of the equipment can be provided with a filter media assembly that filters any air entering thereinto in accordance with various aspects of the present invention which will then allow switching between various flow paths through various filter media having distinguishing filtration properties as will be discussed in greater detail below.

As such, a multi-modal multi-media air filtration system is contemplated herein which can include a base 20 which can be configured to attach to an air intake of a vehicle, a cap 12, and a filter media assembly 100 which is provided between the base 20 and the cap 12. The filter media assembly 100 can then be configured to attach to the base 20 at a first end and to the cap 12 at a second end. The filter media assembly 100 can then have an annular cross-section which can be cylindrical in shape or tapered so as to form a cone having a cavity formed therein. In other words, the filter media assembly 100 spans the distance between the base 20 and the cap 12 and provides a barrier between an inside and an outside thereof wherein air cannot pass from the outside to the inside without passing through the filter media assembly 100. The air which has passed into the interior thereof can then be drawn into the engine for combustion or other functions.

The filter media assembly 100 can then include a first filter media 110 extending along a first annular segment about a circumferential portion of the filter media assembly. As illustrated herein, a flow path across the first filter media 110 is defined as a primary flow path 112, where in the primary flow path 112 extends through a first sidewall portion of the filter media assembly 100 across the first filter media 110. The filter media assembly 100 can then also include a second filter media 120 extending along a second annular segment about a circumferential portion of the filter media assembly 100. As illustrated herein, a flow path across the second filter media 120 is defined as a secondary flow path 122, wherein the secondary flow path 122 extends through a second sidewall portion of the filter media assembly across the second filter media 120. It will then be understood that as illustrated herein the first filter media 110 is provided along a particular circumferential segment of the filter media assembly and spans for the particular circumferential segment from the base 20 to the cap 12. Similarly, the second filter media 120 is provided along its particular circumferential segment of the filter media assembly 100 and also spans the entire distance from the base 20 to the cap 12. The particular filter media are bifurcated and distinct from one another and have distinct boundaries therebetween.

This clear distinction between the first and second filter media allows for use of a blocking assembly 200 having a blocking mechanism 204 to be sized according to the size of the circumferential segment of the second filter media 120 to be provided on an interior portion of the filter media assembly 100. This blocking mechanism 204 can then be configured to move so as to selectively switch between a closed configuration in which only the primary flow path 112 is utilized and an open configuration in which the secondary flow path 122 may be alternatively or additionally utilized. It will be understood, that in the embodiments shown, when the secondary flow path 122 is opened by rotating the blocking mechanism, that both the primary flow path 112 and the secondary flow path 122 are utilized in tandem, however, it is also contemplated herein that an additional second blocking mechanism and associated actuation assembly (not shown) could also be provided which could be configured to block the primary flow path when the secondary flow path is opened thus allowing for individual flow path selection. However, as discussed above, this secondary blocking mechanism configured to block the primary flow path may not be desired, as this second mode of operation, in which the second flow path is utilized, will typically be associated with a desired increased flow rate, which is not hindered by allowing air to pass through all of the filter media contained within the filter media assembly 100.

The blocking assembly 200 can also include an actuation assembly 250 which can then be provided which can be configured to be coupled to the blocking mechanism 204, wherein the actuation assembly 250 can then be configured to effectuate movement of the blocking mechanism 204.

As illustrated herein, the actuation assembly 250 can include an actuator 254 located on an interior surface of the base 20, wherein the actuator 254 can be configured to move the blocking mechanism 204 so as to selectively seal or open the secondary flow path 122. In some such embodiments the blocking mechanism 204 can be configured such that it pivots on a shaft 208, wherein the actuator 254 provides a rotational force to the shaft 208 so as to selectively pivot the blocking mechanism 204 into, or out of, a blocking or closed configuration about the second filter media 120.

In some embodiments, the blocking mechanism 204 can be provided as a curved panel as illustrated herein, wherein the curved panel corresponds in shape and size to an interior surface of the second filter media 120. For example, the blocking mechanism 204 can be provided as a segment of a cone or a cylinder which is configured to match the interior surface of the associated filter media which it blocks.

In some embodiments the first filter media 110 and the second filter media 120 are affixed to one another at opposing respective segments at a first seam 130 and at a second seam 134, wherein the shaft 208 is located parallel to and about the first seam 130, and wherein the blocking mechanism 204 extends from the shaft 208 to the second seam 234 such that the blocking mechanism abuts the second filter media 120 when in the closed configuration. It will be appreciated that the shaft 208 is optional and the blocking mechanism 204 can merely be affixed to the base 20 and the cap 12 about corners thereof, wherein the blocking mechanism 204 pivots about an edge thereof, however, the shaft 208 can offer various benefits such as additional structural strength and increase the ease of providing pivoting points and for facilitating assembly.

It will then be understood that the first filter media 110 can be attached to the second filter media 120 about respective seams 130 and 134 respectively utilizing welding techniques, hot knife bonding, adhesives or other polymeric bonding, clips, or any other readily recognized bonding method.

In some embodiments a pair of sealing protrusions 16 and 26 can be provided, wherein a first sealing protrusion 16 or flange can be provided about the cap 12, and a second sealing protrusion 26 or flange can be provided about the base 20, wherein the respective sealing protrusions 16 or 26 can then be configured to seal against opposing edges of the blocking mechanism 204, i.e. curved panel, in the closed configuration about a top or bottom edge thereof.

In some additional embodiments, a sealing strip 216 can be provided about an interior surface of the second seam 134 of the filter media assembly 100, wherein the blocking mechanism 204 presses against the sealing strip 216 in the closed configurations so as to seal against the sealing strip 216 at a distal edge from the shaft 208 in the closed configuration.

In yet additional embodiments, while the various filter media can have any desired flow, filtration, or other property, in some advantageous embodiments, the first filter media 110 can be provided having a higher relative flow resistance corresponding to a smaller aperture size thus providing finer filtration than the second filter media 120. In other words, the second filter media 120 can be provided which has a lower relative flow resistance corresponding to a larger aperture size, thus providing less filtration, than the first filter media 110. In this manner a high performance or open mode is achieved, that while providing a lower degree of particulate removal, will allow for higher air flow as air is permitted to pass through the lower resistance secondary flow path 122. However, even in the open configuration with the blocking mechanism 208 pivoted radially inward toward a center of the filter media assembly air can still pass through the first filter media 110 as there is no blocking mechanism associated therewith. However, a plurality of blocking mechanisms associated with both filter media, or even a plurality of filter media is also contemplated herein, wherein additional actuation assemblies can be associated with each additional filter media.

In some embodiments, the actuation assembly 250 can include an actuator 254 configured so as to provide rotation to the shaft 208 associated with the blocking mechanism 204. In some such embodiments, the actuator can be a solenoid, however, various additional actuators, such as step motors, worm gears, servo motors, or any other motor which can be adapted to provide the necessary pivoting of the blocking mechanism 204 are also contemplated herein.

In some embodiments, and as illustrated herein, the shaft 204, or an edge portion of the blocking mechanism 204 can be affixed to an interior of the filter media assembly 100 by providing snap-fit or interference fit prongs or clips 214. These clips 214 can be configured to maintain an axial location of the shaft 208, but allow for pivoting or rotation therein.

In some embodiments an alternative multi-modal multi-media air filtration system 50 is contemplated herein which includes an alternative base 400 and actuation assembly 350 which can instead be provided in a manner which is separable from, or not integral with, an alternative filter media assembly 100A. In such an embodiment, and as illustrated in FIGS. 7-12, in this illustrated multi-modal multi-media air filtration system 50 the system can instead utilize an alternative base 400 which is separable from the filter media assembly 100A and can be permanently affixed to, or integral with, the air intake of the vehicle. In this manner the filter media assembly 100A and associated blocking mechanism 304 can be changed without changing the actuation assembly 350 when the various filter media become clogged or otherwise need service. In such an embodiment, the filter media assembly 100A can be provided with, a closed end cap 12, which is identical to the cap discussed above, a blocking mechanism 304, first and second filter media 110 and 120 which can all be identical or have similar features as discussed with the above embodiment. However, in this embodiment the filter media assembly 100A can instead be provided with an alternative interface end cap 70 which is configured to attach to base 400 which is more permanently affixed to the air intake of a particular vehicle. However, in this embodiment the base 400 can be configured such that an alternative actuation assembly 350 can be provided within the air intake to the vehicle to which the base 400 is configured to be affixed such that the actuator 354 is not integral with the filter media assembly 100A, but only capable of interacting with an alternative blocking mechanism 304 near the alternative interface end cap 70, such as by interfacing with a similar pivoting shaft 308 attached to the blocking mechanism 304. In some such embodiments the shaft 308 can be provided with a keyed end 312, and the actuation assembly 350 and actuator 354 can then be provided with a corresponding keyed driver 358 which can be configured to receive the keyed end 312 of the shaft 308 upon installation of the alternative interface end cap 70 onto the base 400 provided on air intake of the vehicle. In the embodiment shown the keyed driver 358 is illustrated as a channel, wherein the keyed end 312 is illustrated as a rectangular or flat headed protrusion corresponding in shape to the channel.

In this embodiment, the filter media assembly can be rotated so as to secure the alternative interface end cap 70 to the alternative base 400 provided on the intake of the vehicle, wherein as the filter media assembly 100 rotates into a proper installed alignment the keyed end 312 rotates into the keyed driver 358.

Further, it has been recognized that as illustrated the orientation of the shaft 308 and corresponding keyed end 312 must be provided in the closed configuration such that the keyed end 312 can properly align and enter into the channel, i.e. the keyed driver 358. In order to ensure proper alignment during installation, in some such embodiments, the shaft 308 can be provided with a torsional spring 316 which can then be configured to bias the blocking mechanism 304 in the closed configuration when not positively actuated.

Figure 11:
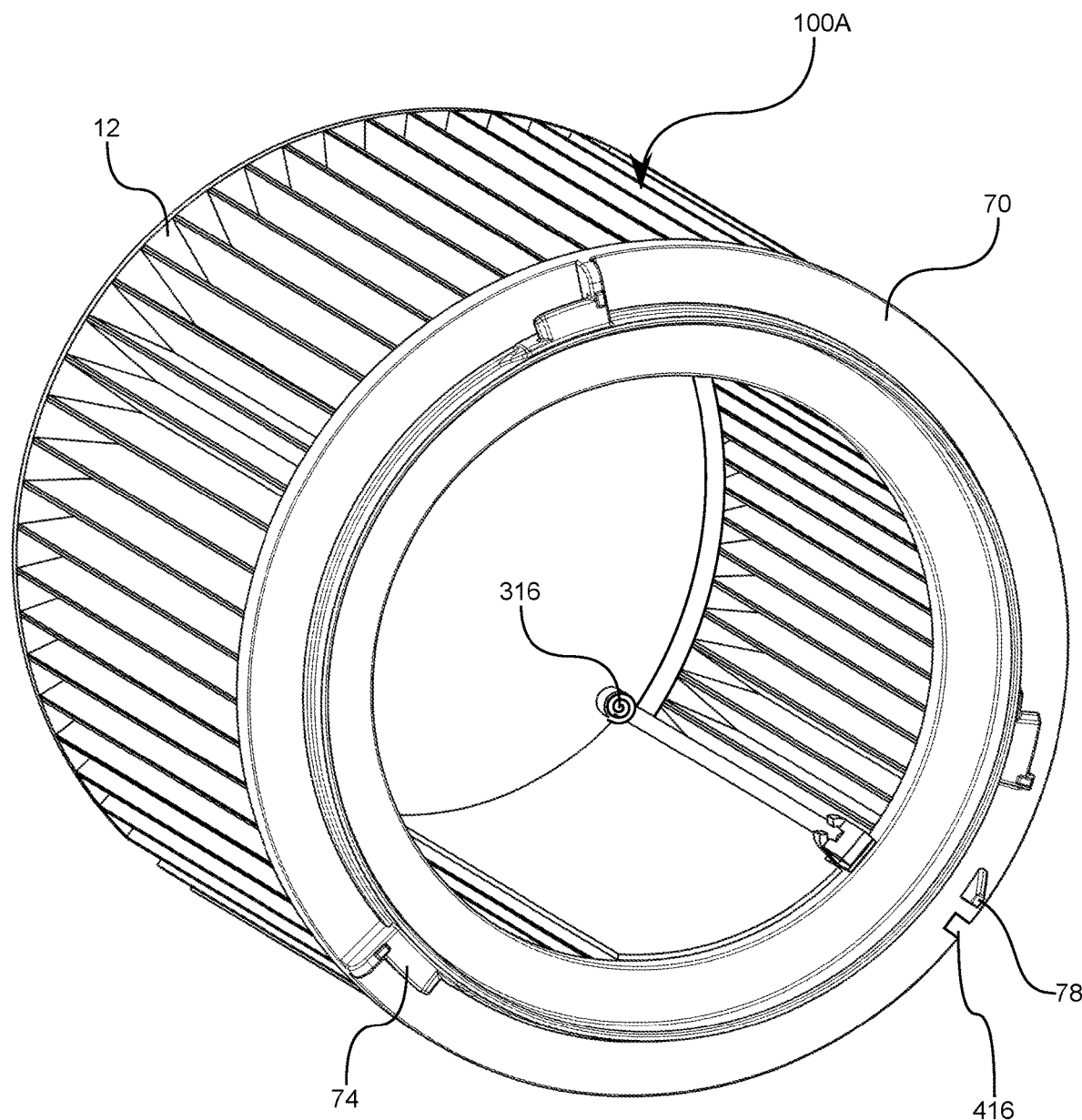
FIG. 11 illustrates a bottom perspective view of a filter element assembly portion of the multi-modal multi-media air filtration system of FIG. 7 in a closed or single flow configuration.
Figure 12:
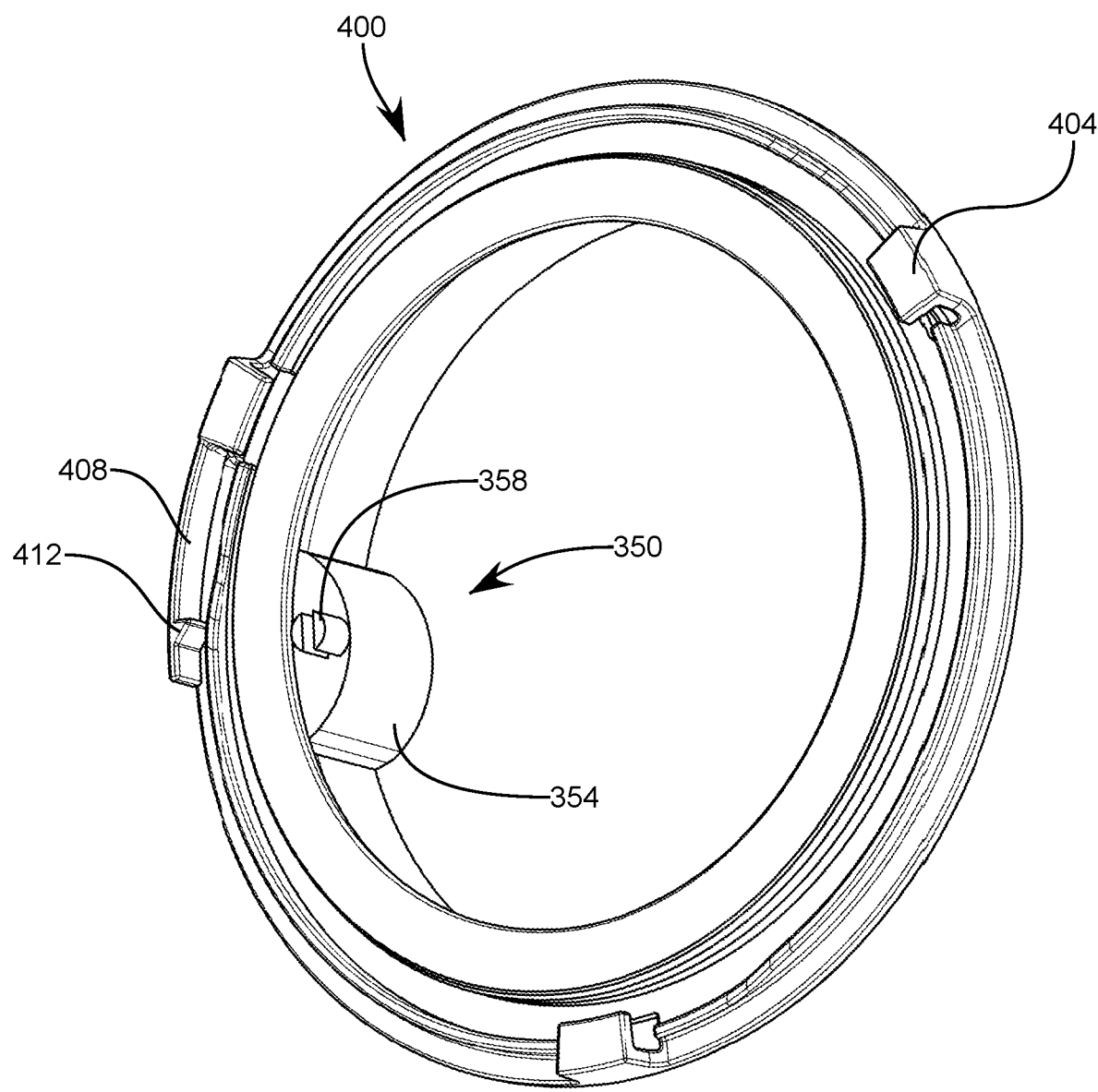
FIG. 12 illustrates a top perspective view of an alternative smart base for use in the multi-modal multi-media air filtration system of FIG. 7.

As illustrated herein, the filter assembly 100A can be provided with a alternative interface end cap which is a bayonet style connection interface. Such systems, instead of relying on threads, instead include a plurality of protrusions or prongs 74, as seen in FIG. 11, which interface with corresponding protrusions or prongs on the opposing interface, i.e. the alternative base 400, which then only require a small degree of rotation to provide any necessary axial compression and locking into place. In yet additional such embodiments, the alternative interface end cap 70 can be provided with one or more alignment or locking features 78, such as a locking pin or fin as illustrated, which can then be configured to interact with corresponding alignment or locking features 408, such as a spring loaded or cantilevered protrusion with a locking barb 412 provided or the alternative base 400. As illustrated between FIGS. 11 and 12, the locking pin 78 can extend from the alternative interface end cap 70 such that when the filter media assembly is rotated onto the smart base the locking barb 412 can engage the locking pin or fin 78 when properly aligned. In such cases, the alignment or locking features can be configured so as to ensure proper radial alignment of the keyed end of the shaft within the keyed driver of the actuation assembly during mounting.

In this manner, because the electronics and actuation assembly 350 are provided about the alternative base 400, which is separable from the alternative filter media assembly 100A, the filter media can be replaced or serviced without necessitating removal, disconnection, etc., of the actuation assembly. This then can save the increased cost of providing new actuation assemblies for every filter media change or the time associated with connecting/disconnecting electrical connections for a simple filter media change. Further, as the actuation assembly 350 is provided on the clean side of the filter media, it can be protected from fouling due to particulates or contaminants in the air stream, as the majority of such will be removed by the filter media.

Figure 13:
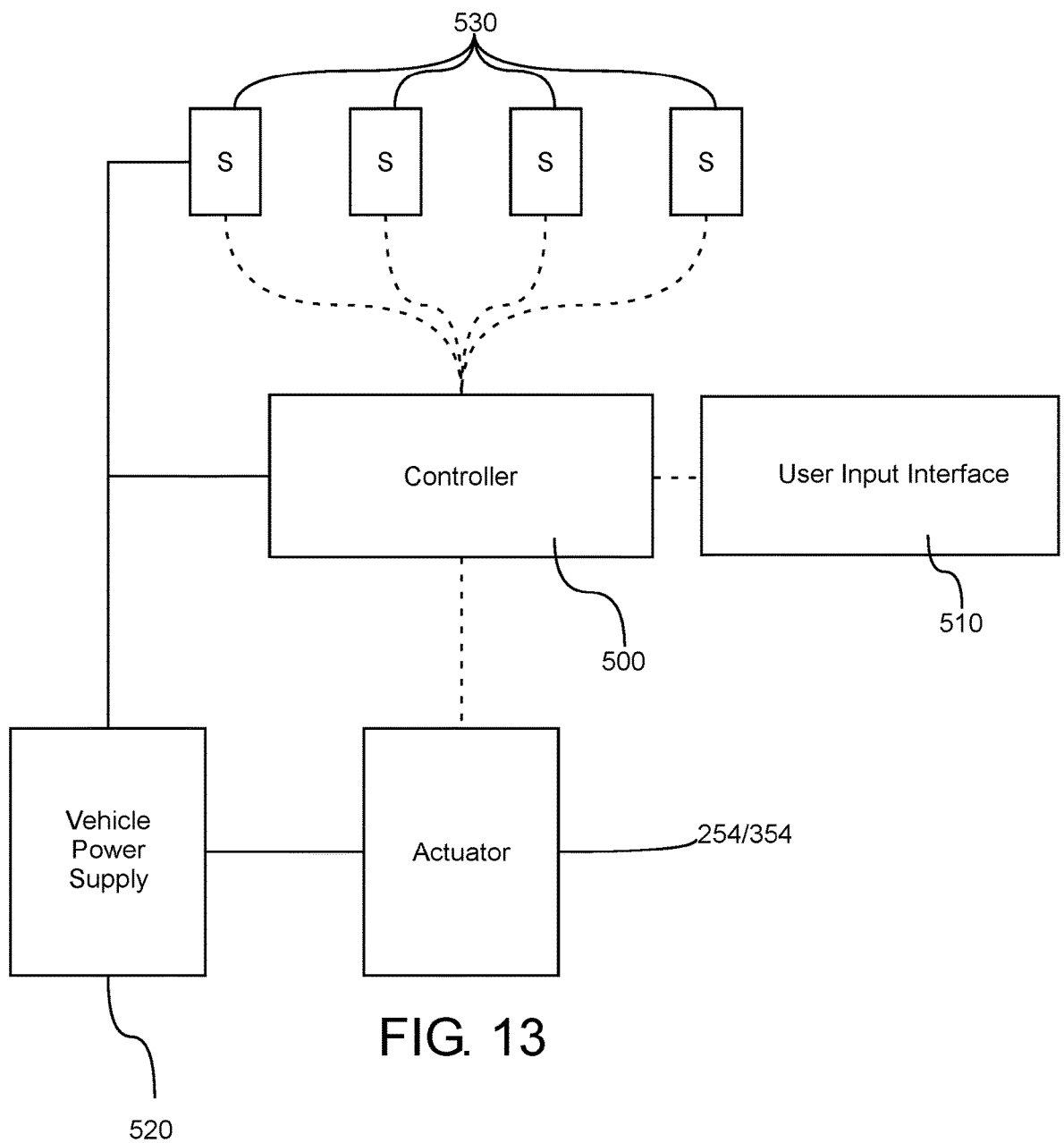
FIG. 13 illustrates illustrate an exemplary power and control schematic of a system configured to operate the multi-modal multi-media air filtration systems as disclosed herein.

In some additional embodiments, and as illustrated in the schematic of FIG. 13, the system can be provided with a controller 500, the controller 500 can then be configured to transmit commands for the actuation assembly 250 or 350 to alternate the associated blocking mechanism between the closed configuration and the open configuration as well as potentially a partially open configuration. In some such embodiments, the controller 500 can also include or be operatively connected to a user input interface 510 which can then be configured to receive user commands with respect to a desired configuration.

In some alternative embodiments, the system can also include a plurality of sensors 530 which can be configured to detect one or more environmental or performance parameters and transmit data to the controller 500, wherein the controller 500 can process the data and make a determination regarding whether to operate the multi-modal multi-media filtration system in the open configuration, the closed configuration, or in a partially open configuration wherein the controller then controls the actuation assembly so as to cause the multi-modal multi-media filtration system to enter an optimal state of filtration.

In some embodiments, and depending on the type of filter media selected, a support structure 124 can be provided about one of the first filter media 110 or the second filter media 120 so as to maintain structural integrity. As discussed briefly above, such as instances in which the second filter media 120 has larger apertures, the support structure can in many cases be required about the second filter media 120 so as to reduce blowouts or tearing thereof.

The support structure 124 can be provided as a polymer or wire mesh so as to maintain the filter media in a particular compressed state as well as reduce bulging or blowouts in response to a pressure differential applied by the engine's drawing of air therethrough.

In some embodiments, the first filtration media 110 can have a range of particular filtration characteristics, such as an air permeability in a range of 150-1300 l/m$^2$s, and a pore size in a range of 30-200 μm. In contrast, the second filter media 120 can have an air permeability in a range of 700-3500 l/m$^2$s and a pore size in a range of 70-700 μm. Additionally, the first and second filter media can have a different pleat numbers or densities, pleat heights, different media thickness, etc., so as to achieve a desired filtration property optimal for a particular performance of filtration level so as to achieve a set of desired mode configurations.

In some embodiments the equation:

$$d = 4 \times 6 \times \cos \alpha \times 10 / p$$

wherein this equation can be used to describe various characteristics of the various filter media and describe various filter media characteristics with regard to one another. In this equation d=pore diameter (μm), p=test pressure (mbar), α=wetting angle at transition liquid/substance, which is many instances can be assumed that cos α=1 in order to simplify calculations, and 6=surface tension of the wetting fluid [mN/m].

Also as contemplated herein, the first filter media 110 and the second filter media 120 can each include a plurality of pleats in order to increase filter media area so as to maintain desired filtration properties with respect to air flow needs of the motor or vehicle. Further the first filter media 110 and second filter media 120 can be provided of a common material having varying aperture sizes, or can be formed utilizing separate materials altogether. For instance, the first filter media could be a fiber filter while the second filter media could be provided as cellulose or some other material. Again, the various combinations of materials adaptable for use are not limited to the examples given herein, but as one of ordinary skill in the art will recognize, that any filter media material suitable for a desired application may be chosen for any of the filter media discussed herein and bonded together so as to form the annular body of the filter media assembly.

Also understood herein, is that the actuator 254 or 354, the controller 500, and sensors 530 will need to be connected to a power supply 520. Such a power supply can be the vehicular system power supply as illustrated, which could be implemented as a connection to a battery or alternator, but could also be a local rechargeable or battery unit provided within the filtration unit itself.

In some embodiments, and as illustrated in FIG. 13, a controller 500 can also be operatively connected to one or more sensors 530, the sensors being capable of detecting a particulate count in the air, air flow rates, air density, temperature, or any number of other environmental or performance related parameters. The controller can then be provided with processing circuitry which can also be configured to determine an optimal degree of filtration and select a mode corresponding thereto and issue a command to the actuator to place the system into the corresponding optimal operation mode as determined.

It will also be understood that the controller can be provided locally or remotely with respect to the filtration unit. In some instances, the controller can be provided in a passenger cabin so as to facilitate the reception of user input. It will then be understood that the controller can communicate with the actuator or actuation assembly utilizing physical wired connections, wireless communication mechanisms, such as Wi-Fi or Bluetooth™, or any other readily understood radio or near field communication methods.

It will also be understood that the blocking mechanism 204 or 304 can be provided about an exterior end surface of the second filter media 120 such that when in the closed position the pressure gradient actually helps pull the blocking mechanism against the second filter media, base, and cap so as to form a more secure seal, however, often housing or other components of the vehicle may interfere with operation, and by providing the actuation mechanism on an interior or clean side, fouling of such components is greatly reduced.

Alternatively, the first filter media can have a lower air flow resistance than the second filter media, however, in this situation it would be preferable to also provide a selective blocking mechanism about the first filter media such that air can be forced through the second air flow path when desired.

Also contemplated herein is a method of providing and operating a multi-media filtration system, wherein the method can include the steps of providing any one of the contemplated systems discussed herein, but further including the steps of: actuating the actuation assembly so as to effectuate movement of the blocking mechanism so as to alternate between a closed configuration wherein the blocking mechanism blocks the secondary flow path and an open configuration where the secondary flow path is at least partially open; providing a rotational force to the blocking mechanism.

The method can also include the steps of: providing a controller configured to control the actuation assembly; providing a processor operatively connected to the controller; providing a plurality of sensors configured to detect one or more parameters and transmit data to the processor, wherein the processor is configured to make a determination an optimal state of filtration associated with the open configuration, the closed configuration, or in a partially open configuration and instruct the controller to control the actuation assembly so as to enter the optimal state of filtration as determined.

This method can also include various alternative steps, which can include: receiving air from an ambient area into an interior portion of the filter media assembly through only the first filter media thus defining a first mode; and alternating to a second mode, the second mode being defined by receiving air through both the first filter media and through the second filter media.

Additionally, the method can include a step of receiving a user input to alternate between the first or closed operation mode and the second or open operation mode or receiving an automatically generated command to alternate between the first operation mode and the second operation mode, the automatically generated command being based on one or more sensed parameters.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

The foregoing has provided a detailed description of various embodiments of a multi-modal multi-media filtration system and various principles associated therewith. Specific examples are used herein to describe the principles and implementations of some embodiments. The description is only used to help convey understanding of the possible methods and concepts. Meanwhile, those of ordinary skill in the art may change the specific manners of implementation and application thereof without departing from the spirit of the invention. The contents of this specification therefore should not be construed as limiting the disclosure.

In the descriptions, with respect to unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the unit(s), device(s), component(s), etc. can be singular, or plural.

Based on various embodiments of the present disclosure, the disclosed apparatuses, devices, and methods may be implemented in other manners. For example, the abovementioned devices can employ various methods of use or implementation as disclosed herein.

Dividing the device into different "regions," "units," or "layers," etc. merely reflect various logical functions according to some embodiments, and actual implementations can have other divisions of "regions," "units," or "layers," etc. realizing similar functions as described above, or without divisions. For example, multiple regions, units, or layers, etc. may be combined or can be integrated into another system. In addition, some features can be omitted, and some steps in the methods can be skipped.

Those of ordinary skill in the art will appreciate that the units, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the invention contemplated by this disclosure and as defined in the following claims. As such, the scope of this disclosure is to be accorded the broadest reasonable interpretation so as to encompass such modifications and equivalent structures.

We claim:

1. A multi-modal multi-media filtration system, the system comprising:
   a base being configured to attach to an air intake of a vehicle;
   a cap;
   a filter media assembly being provided between the base and the cap, the filter media assembly being configured to attach to the base at a first end and to the cap at a second end, the filter media assembly having an annular cross-section, the filter media assembly further comprising:
      a first filter media extending along a first annular segment about a circumferential portion of the filter media assembly,
         the first filter media having a flow resistance corresponding to first filter media aperture size,
         wherein a flow path across the first filter media is defined as a primary flow path,
         wherein the primary flow path extends through a first sidewall portion of the filter media assembly across the first filter media;
      a second filter media different from the first filter media, the second filter media extending along a second annular segment about a different circumferential portion of the filter media assembly,
         the second filter media having a lower relative flow resistance corresponding to a larger filter media aperture size than the first filter media;
         a flow path across the second filter media is defined as a secondary flow path,
         wherein the secondary flow path extends through a second sidewall portion of the filter media assembly across the second filter media;
      wherein the first filter media has a higher relative flow resistance corresponding to a smaller aperture size thus providing finer filtration than the second filter media
      a blocking mechanism, the blocking mechanism being configured to move so as to selectively switch between a closed configuration in which only the primary flow path is utilized and an open configuration in which the secondary flow path is utilized; and
   an actuation assembly configured to be coupled to the blocking mechanism, the actuation assembly being configured to effectuate rotational movement of the blocking mechanism to close against an interior side of the second filter media whenin the closed configuration, the curved panel rotatable to selectively seal or open the secondary flow path.

2. The multi-modal multi-media filtration system of claim 1, wherein
   the actuation assembly is affixed to the base.

3. The multi-modal multi-media filtration system of claim 1, wherein
   the actuation assembly is provided within the air intake to the vehicle to which the base is configured to be affixed.

4. The multi-modal multi-media filtration system of claim 1, comprising
   a support structure provided about one of the first filter media or the second filter media.

5. The multi-modal multi-media filtration system of claim 1, comprising
   a support structure provided about the second filter media.

6. The multi-modal multi-media filtration system of claim 1, the first filter media and the second filter media each include a plurality of pleats.

7. The multi-modal multi-media filtration system of claim 1, wherein
   while in the open configuration both the primary flow path and the secondary flow path are open.

8. The method of providing and operating a multi-media filtration system of claim 1, further comprising:
   providing a controller configured to control the actuation assembly;
   providing a user input interface operatively connected to the controller;
   wherein the user input interface can receive a user input command associated with the open configuration, the closed configuration, or in a partially open configuration and the controller is then configured to control the actuation assembly so as to selected configuration.

9. A method of providing and operating a multi-media filtration system according to claim 1, the method comprising:
   providing a controller configured to control the actuation assembly;
   providing a processor operatively connected to the controller;
   providing a plurality of sensors configured to detect one or more parameters and transmit data to the processor,
   wherein the processor is configured to make a determination regarding an optimal state of filtration associated with the open configuration, the closed configuration, or in a partially open configuration and instruct the controller to control the actuation assembly so as to enter the optimal state of filtration.

10. The method of providing and operating a multi-media filtration system of claim 9, further comprising:
   providing a controller configured to control the actuation assembly;
   providing a user input interface operatively connected to the controller;
   wherein the user input interface can receive a user input command associated with the open configuration, the closed configuration, or in a partially open configuration and the controller is then configured to control the actuation assembly so as to selected configuration.

11. The multi-modal multi-media filtration system of claim 1, further comprising a controller, the controller being configured to transmit commands for the actuation assembly to alternate the blocking mechanism between the closed configuration and the open configuration.

12. The multi-modal multi-media filtration system of claim 11, wherein
the controller further comprises a user input interface configured to receive user commands with respect to a desired configuration.

13. The multi-modal multi-media filtration system of claim 11, comprising
a plurality of sensors configured to detect one or more parameters and transmit data to the controller,
wherein the controller can process the data and make a determination regarding whether to operate the multi-modal multi-media filtration system in the open configuration, the closed configuration, or in a partially open configuration
wherein the controller then controls the actuation assembly so as to enter an optimal state of filtration.

14. The multi-modal multi-media filtration system of claim 1, wherein
the actuation assembly includes an actuator located on an interior surface of the base,
the actuator being configured to rotate move the blocking mechanism so as to selectively seal or open the secondary flow path.

15. The multi-modal multi-media filtration system of claim 14, wherein
the blocking mechanism pivots on a shaft, wherein the actuator provides a rotational force to the shaft.

16. The multi-modal multi-media filtration system of claim 15, wherein
the first filter media and the second filter media are affixed to one another at opposing respective segments at a first seam and at a second seam,
wherein the shaft is located parallel to and about the first seam, and
wherein the blocking mechanism extends from the shaft to the second seam abutting the second filter media in the closed configuration.

17. The multi-modal multi-media filtration system of claim 16, further comprising
a sealing strip provided about the second seam of the filter media assembly,
wherein the blocking mechanism is configured to seal against the sealing strip at a distal edge from the shaft in the closed configuration.

18. The multi-modal multi-media filtration system of claim 15, further comprising
a pair of sealing protrusions,
wherein a first sealing protrusion provided about the cap, and
a second sealing protrusion is provided about the base,
wherein the sealing protrusions are configured to seal against opposing edges of the blocking mechanism in the closed configuration.

19. The multi-modal multi-media filtration system of claim 15, wherein
the actuation assembly includes an actuator configured so as to provide rotation to the shaft.

20. The multi-modal multi-media filtration system of claim 19, wherein the actuator is a solenoid.

21. The multi-modal multi-media filtration system of claim 15, wherein
the actuation assembly is provided within the air intake to the vehicle to which the base is configured to be affixed.

22. The multi-modal multi-media filtration system of claim 21, wherein
the shaft is provided with a keyed end, and
wherein the actuation assembly is provided with a corresponding keyed driver configured to receive the keyed end of the shaft upon installation of the base onto the air intake of the vehicle.

23. The multi-modal multi-media filtration system of claim 22, wherein
the shaft is provided with a torsional spring configured to bias the blocking mechanism in the closed configuration.

24. The multi-modal multi-media filtration system of claim 21, wherein
the base is provided with one or more alignment features configured to interact with corresponding alignment features provided on the air intake of the vehicle,
the alignment features configured to ensure proper radial alignment of the keyed end of the shaft within the keyed driver of the actuation assembly during mounting.

* * * * *